United States Patent
Novak et al.

(10) Patent No.: US 6,643,669 B1
(45) Date of Patent: Nov. 4, 2003

(54) METHOD FOR OPTIMIZATION OF SYNCHRONIZATION BETWEEN A CLIENT'S DATABASE AND A SERVER DATABASE

(75) Inventors: Lars Novak, Lund (SE); Jörgen Birkler, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 375 days.

(21) Appl. No.: 09/637,035

(22) Filed: Aug. 10, 2000

Related U.S. Application Data

(60) Provisional application No. 60/189,121, filed on Mar. 14, 2000.

(51) Int. Cl.[7] .................................................. G06F 17/30
(52) U.S. Cl. ........................................ 707/201; 709/218
(58) Field of Search ................................ 707/201, 100, 707/10, 20, 218

(56) References Cited

U.S. PATENT DOCUMENTS

| | | | |
|---|---|---|---|
| 5,640,556 A | 6/1997 | Tamura | 395/610 |
| 5,710,922 A | 1/1998 | Alley et al. | 395/617 |
| 5,790,848 A * | 8/1998 | Wlaschin | 707/201 |
| 5,870,759 A | 2/1999 | Bauer et al. | 707/201 |
| 5,926,816 A | 7/1999 | Bauer et al. | 707/8 |
| 5,970,502 A | 10/1999 | Salkewicz et al. | 707/201 |
| 5,978,813 A | 11/1999 | Foltz et al. | 707/201 |
| 5,991,771 A | 11/1999 | Falls et al. | 707/202 |
| 5,999,947 A | 12/1999 | Zollinger et al. | 707/203 |
| 6,014,669 A | 1/2000 | Slaughter et al. | 707/10 |
| 6,035,412 A * | 3/2000 | Tamer et al. | 707/204 |
| 6,141,664 A * | 10/2000 | Boothby | 707/201 |
| 6,226,650 B1 * | 5/2001 | Mahajan et al. | 379/93.12 |
| 6,269,369 B1 * | 7/2001 | Robertson | 345/716 |
| 6,442,554 B1 * | 8/2002 | Reddy et al. | 707/100 |
| 6,446,090 B1 * | 9/2002 | Hart | 707/201 |

FOREIGN PATENT DOCUMENTS

| | | |
|---|---|---|
| WO | WO 98/21648 | 5/1998 |
| WO | PCT/EP01/02765 | 9/2001 |

* cited by examiner

*Primary Examiner*—Greta Robinson
*Assistant Examiner*—S. R. Pannala
(74) *Attorney, Agent, or Firm*—Jenkens & Gilchrist, P.C.

(57) ABSTRACT

A method and system for synchronizing a first database with a second database is disclosed. A client containing a first version of a database transmits a first synchronization message from the client to the server. The message contains MAPITEM records from a previous synchronization process, UPDATES for the present synchronization process, a current synchronization time and a last synchronization time. A second version of the database within a server is updated responsive to the first synchronization message. The server transmits a second synchronization message to the client containing UPDATES to be performed at the client, the RESULTS of the updates requested by the client, and the received current synchronization time from the first synchronization message. The client updates the first database, removes the previously transmitted MAPITEMs and stores the MAPITEM records for the present synchronization process for transmission during a next synchronization process.

12 Claims, 2 Drawing Sheets

METHOD FOR OPTIMIZATION OF SYNCHRONIZATION BETWEEN A CLIENT'S DATABASE AND A SERVER DATABASE

RELATED APPLICATIONS

This application claims priority from and incorporates herein by reference the entire disclosure of U.S. Provisional application Ser. No. 60/189,121 filed Mar. 14, 2000.

BACKGROUND OF THE INVENTION

1. Technical Field of the Invention

The present invention relates to database maintenance, and more particularly, to the synchronization of client and server databases which are remotely located from each other.

2. Description of Related Art

The proliferation of networks, and in particular wide area networks, has led to the circumstance where multiple versions or copies of a same database may exist at two separate locations, for instance, at a server and at a client within the network. Differences between the entries made at a client and at a server within the same database requires periodic updating of each of the version of the database with respect to each other in order to insure that the same information is stored within each versions of the database. This process is referred to as synchronization and involves the transmission of information between each version of the of the database indicating the changes made since a last synchronization.

During the occurrence of a synchronization procedure between a client and server databases, each of the versions of the database must be locked to prevent user input to the database during the synchronization process. This is due to the fact that if a database is not locked during the synchronization procedure, there is a risk that modifications may be made during the synchronization process that will not be detected, and create discrepancies between the supposedly synchronized versions of the database. This, of course, limits access to a database and may prevent a user from performing desired operations if the user attempts to contact the database during a synchronization procedure. Thus, some manner for enabling continued updating of databases during a synchronization process of the database would be greatly desirable.

Furthermore, the synchronization process requires a number of messages to be transmitted back and forth between the client version of the database and the server version of the database. Some manner of minimizing or optimizing the number of messages transmitted between the databases would enable the process to be carried out in a faster manner. Thus, minimizing the amount of time for the synchronization process to utilize system resources. This can be very important in systems such as wireless transmission systems wherein radio link bandwidth is required to transmit synchronization messages between the databases.

SUMMARY OF THE INVENTION

The present invention overcomes the foregoing and other problems with a method and system for synchronizing a first database located within a client with a second database located within a server. Upon initiation of the synchronization process, the client transmits a first synchronization message to the second database at the server. The first synchronization message includes MAPITEM records from a previous synchronization process of the databases, UPDATES to be performed at the second database, a current synchronization time of the present synchronization process and a time for the last synchronization process.

Upon receipt of the first synchronization message at the server, the second database is updated responsive to the first synchronization message. The server transmits a second synchronization message to the client. The second synchronization message contains UPDATES to be performed at the client database, the RESULTS of the requested changes in the first synchronization message and the current synchronization time received within the first synchronization message. Responsive to the second synchronization message the client updates the first database responsive to any UPDATES within the second synchronization message and deletes the previously transmitted MAPITEM records so that the MAPITEM records for the present synchronization process may be stored for transmission during a next synchronization process.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
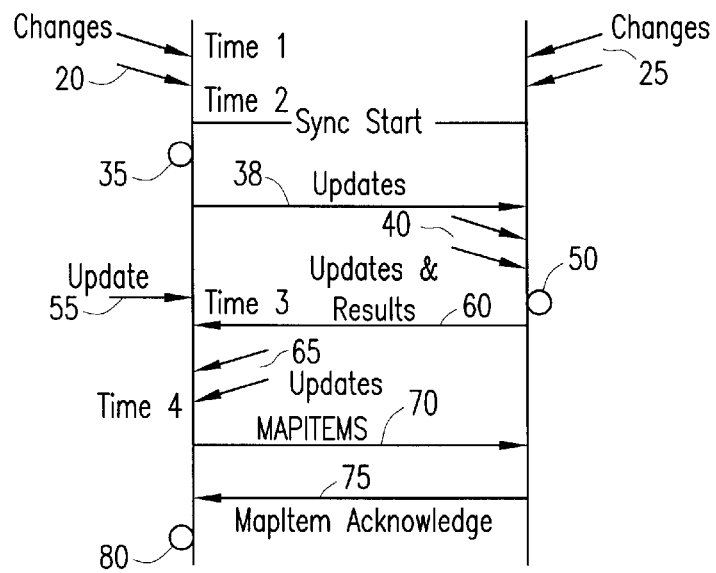
FIG. 1 is an illustration of a prior art synchronization process between a client and server databases.

Referring now to the drawings, and more particular to FIG. 1, there is illustrated a prior art synchronization process of a database between a client 10 and server 15. While the following description refers to separate databases at the client 10 and server 15, it should be realized that these are actually different versions of the same database. Two entries (changes) 20 have been made at the client 10 since the last synchronization process and two entries (changes) 25 have been made at the server 15 since the last synchronization process. Thus, four new entries must be accounted for within both the client 10 and server 15 databases. The synchronization process begins at 30 (Time 2). During a synchronization process the databases contained within the client 10 and server 15 are locked out such that no new entries may be made to the databases.

Initially, the client 10 must determine at 35 any changes made to the database since the last synchronization time. After the number of changes since the last synchronization time has been determined, the client transmits any UPDATES 38 to the server 15. An UPDATE 38 includes an operation, for example, add, delete, update, remove, move, copy, etc.; a source record identifier indicating the record which was originally changed in the client 10; a target record identifier identifying the record within the server 15 to be changed; and record data comprising the data to be changed.

Upon receipt of the UPDATE 38, the server 15 updates the indicated records received from the client at 40. This procedure consists of processing the provided record data in the manner indicated by the operation on the target record according to the provided record data. All of this information is contained within the UPDATE 38. The server 15 determines at 50 the number of changes made to the database since the last synchronization time (Time 1) with the client 10. At Time 3, an additional update 55 is attempted at the client 10. As the database is locked at this period, the update at the client is not permitted.

After the server 15 has determined the changes 25 to the database since last synchronization with the client 10, the server transmits UPDATES plus RESULTS message 60 back to the client 10. The UPDATE portion consists of the same information described previously (i.e., operation, a source record identifier, a target record identifier and record data). The RESULT portion includes the results of the operation performed at the server 15 which was responsive to the previously transmitted UPDATE message, a source record identifier for the originally requested change, and the target record identifier for the changed record at the server.

In response to the message 60 from the server 15, the client 10 performs the requested updates 65 at Time 4. During the update process, the client 10 maintains a mapping record of the mapping between the server record identifiers and the client record identifiers. After the updates at the server 15 and the client 10 are completed, these mapping records are transmitted to the server 15 as MAPITEMs 70. A MAPITEM consists of the server record identifier, the client record identifier and the results of the operations originally requested by the client and the server and are stored within a table. In response to the MAPITEMs 70, the server 15 transmits a MAPITEM acknowledge message 75 back to the client 10. The client deletes the MAPITEM records from its memory and sets at 80 the last synchronization time to Time 4. This completes the synchronization process.

Figure 2:
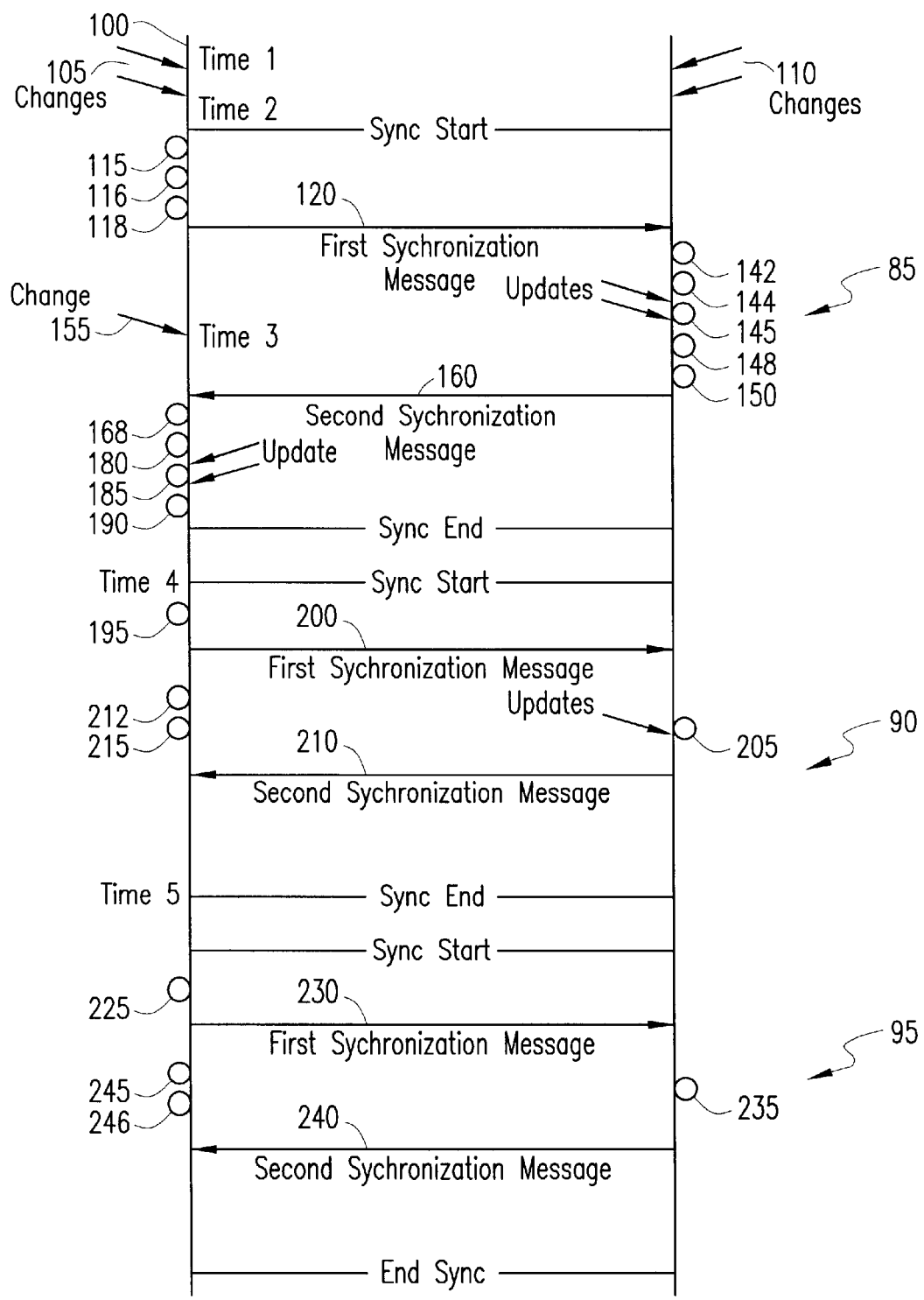
FIG. 2 illustrates the improved synchronization process of the present invention.

Referring now to FIG. 2, there is illustrated the database synchronization process of the present invention wherein a database need not be locked. This enables updates to be performed during the synchronization process and also minimizes the amount of time necessary to accomplish the synchronization process. Initially, it is noted that three separate synchronization processes are illustrated in FIG. 2 at 85, 90 and 95, respectively. The previous synchronization process of the database last began at 100 (Time 1). Since this time, four additional changes have occurred to the database. Two changes 105 have been made at the client 10 and two additional changes 110 have been made at the server 15.

At the beginning of the synchronization process, the client 10 determines at 115 the number of changes made to the database at the client since the last synchronization process at Time 1. The client 10 also determines at 116 the number of MAPITEM records from the previous synchronization process which must be transmitted to the server 15. The client compares the changes 105 made since the last synchronization process to the stored MAPITEM records to determine at 118 which UPDATES have been previously made to the server and which UPDATES have not been made at the server. Next, the client 10 transmits a first synchronization message 120 to the server 15.

Figure 3:
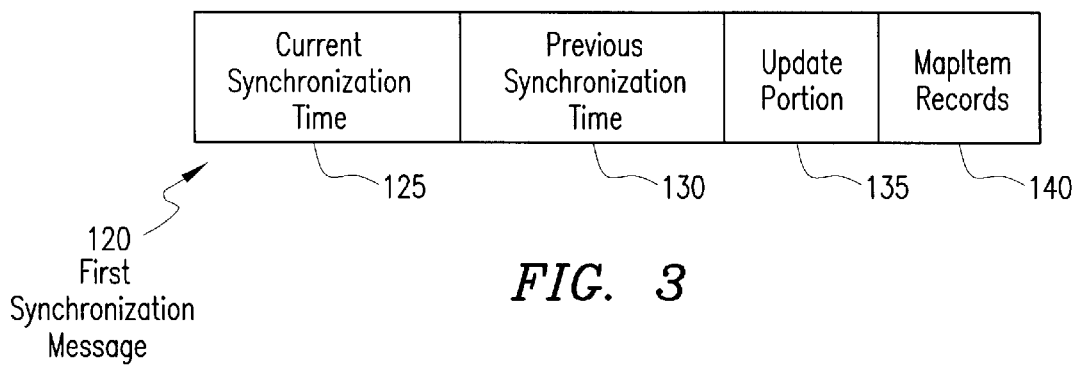
FIG. 3 is an illustration of the first synchronization message.

Referring now also to FIG. 3, the first synchronization message 120 contains the current synchronization time 125, the previous synchronization time 130, an UPDATE 135 portion containing updates to be performed by the server 15, and the determined MAPITEM records 140 from the previous synchronization process. The current synchronization time 125 comprises the time at which the present synchronization process was begun (Time 2). The previous synchronization time 130 indicates the point at which the previous synchronization process began (Time 1). This enables a determination of all changes to the database made between the previous synchronization time 130 and the current synchronization time 125. The UPDATE 135 include an operation, for example, add, delete, update, remove, move, copy, etc.; a source record identifier indicating the record which was originally changed; a target record identifier identifying the record within the server to be changed; and record data comprising the data to be changed. The MAPITEM records 140 comprise the server record identifier and the client record identifier for the records updated during the previous synchronization process, and the results of the operation from the previous synchronization process.

Referring now back to FIG. 2, once the server 15 receives the first synchronization message 120, the server determines at 142 whether the current synchronization time 125 contained within the first synchronization message 120 is after the provided last synchronization time 130. If so, the server 15 updates at 144 a mapping table at the server using the received MAPITEM records 140. The server 15 next updates at 145 the records indicated in the UPDATE portion 135 of the synchronization message 120. The server stores at 148 the received current synchronization time 125 as the last synchronization time and determines the number of changes made at the server at 150. After determining the number of changes, the server 15 transmits a second synchronization message 160 back to the client 10. At Time 3 an additional change 155 is made to the database at the client 10. Since the database is not locked, the change 155 may be made to the database, and the update to the server will occur during the next synchronization process 90.

Figure 4:
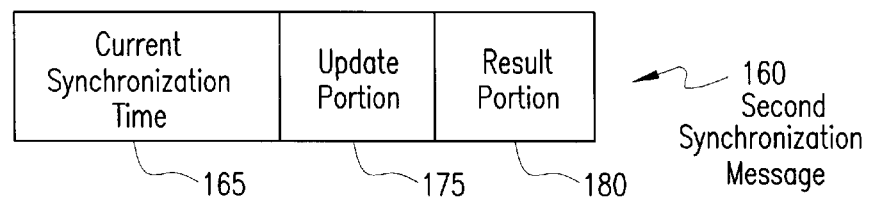
FIG. 4 is an illustration of the second synchronization message.

Referring now also to FIG. 4, there is illustrated the second synchronization message 160 which includes the current synchronization time 165 received from the client 10 in the first synchronization message and a RESULT portion 170 including the results of the updates performed at the server, the source record which was originally changed at the client and the target record identifier of the record changed at the server 15. The second synchronization message 160 further includes an UPDATE portion 175 identifying the updates made at the server to be made in the corresponding records of the client. The UPDATE portion 175 includes an operation, for example, add, delete, update, remove, move, copy, etc.; a source record identifier indicating the record which was originally changed; a target record identifier identifying the record within the client to be changed; and record data comprising the data to be changed.

Referring now back to FIG. 2, the client 10 determines at 168 whether the received current synchronization time 15 is after the last synchronization time, and if so, updates the last synchronization time to the current synchronization time at 180. The client 10 performs the updates indicated by the UPDATE portion 175 at 185 and stores the new MAPITEM records for the present synchronization process 85 at 190 in place of the MAPITEM records stored from the previous synchronization process. Unlike the prior art methods, the MAPITEM records for the synchronization process 85 are transmitted within a next synchronization process 90 rather than within the present synchronization process 85. This limits the number of messages required to be transmitted during the synchronization process and limits required bandwidth for the process.

The synchronization process 90 beginning at Time 4 occurs substantially similarly to the synchronization process 85 describer above. The client 10 initially determines at 195 the changes made since the last synchronization process 85 beginning at Time 2. A first synchronization message 200 is transmitted from the client 10 to the server 15 including the previously described information the MAPITEM records for the previous synchronization process 85. The server 15 is updated with this information at 205, and the received current synchronization time and the RESULTS of the updates requested in first synchronization message 200 are transmitted back to the client 10 from the server 15 in a second synchronization message 210. It should be noted that the second synchronization message 210 does not include an UPDATE portion 175 since no changes have been made to the database at the server 15 since the last synchronization process 85. The client 10 confirms the current synchronization time is after the last synchronization time and sets the last synchronization time equal to the current synchronization time at 212. The client 10 next deletes the previously stored MAPITEM records from the previous synchronization process 85 and stores the present MAPITEM records for the current synchronization process 90 at 215.

During the third synchronization process 95 beginning at Time 5, the client 10 determines that only a single change 205 has been made since the previous synchronization time (Time 4). However, a comparison at 225 of this change 205 with the stored MAPITEM records shows that these changes all comprise part of the previous synchronization process 90, and all changes have already been made to the server 15. Thus, the first synchronization message 230 transmitted from the client 10 to the server 15 only includes the present synchronization time, the previous synchronization time and the MAPITEM records 140 for the previous synchronization process 90. The server 15 determines at 235 that no updates are needed so only the present synchronization time is returned to the client 10 within the second synchronization message 240. In response to the second synchronization message 240, the client 10 determines that the received synchronization time is after the last synchronization time and sets at 245 the last synchronization time equal to the current synchronization time. The previously transmitted MAPITEM records 140 for the previous synchronization process 90 are then deleted at 246. No further MAPITEM records are stored since no updates were performed during the third synchronization process 95.

Rather than transmitting the present synchronization time and the last synchronization time within the synchronization messages between the client 10 and server 15, a change counter may be included within the synchronization messages. A change counter is a counter within the databases that increases by one for each change made to the database. Thus, rather than tracking synchronization times, the database would track number of changes to a database to enable the database to remain open during the synchronization process when all changes from change 0 to change 4 (for example) where made.

The present invention provides an improved method of synchronization between a database located within both a client and a server such that the database need not be locked during the synchronization process. This is accomplished by transmitting information relating to the beginning time of the last synchronization process and the beginning time of the current synchronization process. This enables the tracking of any changes to the database made during synchronization process. Furthermore, the described method utilizes less of the communications bandwidth of a link between the client and the server since the MAPITEM records are not separately transmitted during its own synchronization process but are maintained and transmitted during a subsequent synchronization process.

The previous description is of a preferred embodiment for implementing the invention, and the scope of the invention should not necessarily be limited by this description. The scope of the present invention is instead defined by the following claims.

What is claimed is:

1. A method for synchronizing a first database with a second database, comprising the steps of:

transmitting a first synchronization message from the first database to the second database, the first synchronization message containing mapping records from a previous database synchronization process, updates for the second database, a current synchronization time and a last synchronization time, wherein the step of transmitting a first synchronization message further comprises the steps of:

determining a number of changes since the last synchronization time;

determining which of at least one stored mapping record to send as the mapping records from the previous synchronization process;

comparing the determined number of changes to the determined at least one stored mapping record to determine the updates for the second database;

updating the second database responsive to the first synchronization message;

transmitting a second synchronization message from the second database to the first database, the second synchronization message comprising updates for the first database, results of updates responsive to the first synchronization message and the received current synchronization time from the first synchronization message;

updating the first database responsive to the second synchronization message;

storing new mapping records for a present synchronization process for transmission during a next synchronization process.

2. The method of claim 1, wherein the step of updating the second database further comprises the steps of:

confirming that the received current synchronization time is after the received last synchronization time;

updating a mapping table responsive to the received mapping records; and updating records of the second database responsive to the updates for the second database in the first synchronization message.

3. The method of claim 2 wherein the step of updating further comprises the step of storing the current synchronization time as the last synchronization time at the second database.

4. The method of claim 1, wherein the step of updating the first database further comprises the step of updating records of the first database responsive to the updates for the first database in the second synchronization message.

5. The method of claim 4, wherein the step of updating the first database further comprises updating a last synchronization time responsive to the second synchronization message.

6. The method of claim 1, wherein the step of storing new mapping records further comprises the steps of removing the mapping records contained within the first synchronization message.

7. A system for achieving synchronization between a first database and a second database, comprising:

a client associated with the first database, the client configured to:

transmit a first synchronization message from the first database to the second database, the first synchronization message containing mapping records from a previous database synchronization process, updates for the second database, a current synchronization time and a last synchronization time, wherein the client is further configured to:
- determine a number of changes since the last synchronization time;
- determine which of at least one stored mapping record to send as the mapping records from the previous synchronization process;
- compare the determined number of changes to the determined mapping records to determine the updates for the second database;
- store new mapping records for transmission during a next synchronization process responsive to a second synchronization message;
- update the first database response to the second synchronization message;

a server associated with the second database, the server configured to:
- update the second database responsive to the first synchronization message;
- transmit the second synchronization message from the second database to the first database, the second synchronization message comprising updates for the first database, results of updates responsive to the first synchronization message and the received current synchronization time from the first synchronization message.

8. The system of claim 7, wherein the server is further configured to:
- confirm that the received current synchronization time is after the received last synchronization time;
- update a mapping table responsive to the received mapping records; and
- update records of the second database responsive to the updates for the second database in the first synchronization message.

9. The system of claim 7 wherein the server is further configured to store the current synchronization time as the last synchronization time at the second database.

10. The system of claim 9, wherein the client is further configured to determine the received current time is after the last synchronization time.

11. The system of claim 7, wherein the server is further configured to update records of the first database responsive to the updates for the first database in the second synchronization message.

12. The system of claim 7, wherein the server is further configured to removing the mapping records contained within the first synchronization message.

* * * * *